United States Patent

Verduyn

[11] Patent Number: 5,114,075
[45] Date of Patent: May 19, 1992

[54] SPRAYING SYSTEM FOR TREATING A FLUE GAS

[75] Inventor: Hendrik A. Verduyn, Krimpen a/d IJssel, Netherlands

[73] Assignee: Seac International B.V., Krimpen a/d IJssel, Netherlands

[21] Appl. No.: 513,094

[22] Filed: Apr. 19, 1990

[30] Foreign Application Priority Data

Apr. 20, 1989 [NL] Netherlands ............ 8900993

[51] Int. Cl.⁵ ............................................ B05B 1/24
[52] U.S. Cl. .................. 239/135; 239/290; 239/397.5; 239/419.3; 261/115
[58] Field of Search ............... 261/DIG. 9, 115-118; 239/397.5, 419.3, 290, 424, 428, 135; 110/215

[56] References Cited

U.S. PATENT DOCUMENTS

| | | | |
|---|---|---|---|
| 1,530,510 | 3/1925 | Morse | 239/397.5 |
| 3,245,622 | 4/1966 | McBride | 239/424 |
| 3,610,536 | 10/1971 | Pease et al. | 239/419.3 |
| 3,763,634 | 10/1973 | Alliger | 261/118 |
| 4,070,424 | 1/1978 | Olson et al. | 261/116 |
| 4,083,932 | 4/1978 | Muraco et al. | 261/116 |
| 4,960,244 | 10/1990 | Maag et al. | 239/424 |

Primary Examiner—Bernard Nozick
Attorney, Agent, or Firm—Peter L. Michaelson

[57] ABSTRACT

This invention relates to a spraying system for spraying a liquid, such as water, to be used in a plant for treating flue gases, provided with at least a liquid supply pipe, a spray body, and a spray head, which is characterised in that the spray body (5) and the supply pipe (4) are surrounded by a housing (1,2) thermally insulating the spray body (5) and the supply pipe (4) from the surroundings, the spray body (5) is fastened to the housing (1) of the supply pipe (4), which fastening is such that there is little heat transport from the spray body (5) to the housing (1), and the housing (2) is located near the spray body (5) at some distance therefrom.

6 Claims, 1 Drawing Sheet

SPRAYING SYSTEM FOR TREATING A FLUE GAS

FIELD OF THE INVENTION

This invention relates to a spraying system and a process for treating a flue gas.

BACKGROUND OF THE INVENTION

It is known to supply water to flue gases, e.g., originating from incinerator plants, to lower the flue gas temperature or to reduce the amount of discharged substances harmful to the environment. To achieve this object, water or an aqueous solution is sprayed into the flue gases, if required after a preceding treatment of the gases in a fluidized bed. By withdrawing the heat required for evaporation, the temperature of the flue gases decreases, which results in less thermal load on the environment. This temperature drop is often also required in connection with an optional subsequent treatment of the flue gases, e.g., a filtration. The filtration equipment is often not resistant to the temperature of untreated flue gases.

It is common practice to spray water or an aqueous solution into flue gases by means of sprayers, which may be of different types. It is known, for instance, to use two-phase sprayers, such as ultrasonic sprayers. It is also possible to use sprayers based on the spraying effect of a liquid supplied under high pressure.

The use of different types of sprayers often results in the problem that corrosion and/or erosion wears the sprayers rapidly. When sprayers are used for treating flue gases having a temperature close to the acidic dew point of the flue gases, those parts of the sprayers contacting the flue gases under conditions of condensation will easily corrode. This is especially the case with flue gases having a relatively low temperature. Corrosion may also occur in the case of condensation of acidic constituents of the flue gases on metal parts of the sprayers as a result of the low temperature of these metal parts. It is possible to partly solve this problem by using expensive, corrosion-resistant materials, such as nickel steel and the like. However, this entails very high cost, while the problem is not adequately solved though.

During treatment of flue gases contaminated with solids, e.g., as a result of a preceding treatment in a bed of solid particles, such as a fluidized bed, erosion of the spray head often occurs owing to a reduced pressure formed near the spray head, which results in that solids from the flue gases are drawn to the head.

There is therefore a need for a spraying system less sensitive to corrosion caused by the acidic constituents of the flue gases to be treated. There is also a need for a spraying system less sensitive to erosion of the spray head.

SUMMARY OF THE INVENTION

The present invention provides a spraying system for spraying a liquid, such as water, to be used in a plant for treating flue gases, provided with at least a liquid supply pipe, a spray body, and a spray head, wherein the spray body and the supply pipe are surrounded by a housing thermally insulating the spray body and the supply pipe from the surroundings, the spray body is fastened to the housing of the supply pipe, which fastening is such that there is little heat transport from the spray body to the housing, and the housing is located near the spray body at some distance therefrom.

Surprisingly, it has been found that with the spraying system according to the invention no corrosion problems occur as a result of condensation of acidic constituents from the flue gases. To achieve this result, a minimum contact surface between the spray body and the jacket surrounding the supply pipe is essential, so that the cold transport to this jacket is as small as possible. In practice, this minimum contact can be obtained by using as jacket a metal tube to which the spray head is fastened at two points preferably located at the bottom and at the top end of the tube.

The housing is preferably composed of two interconnected jackets of which one surrounds the supply pipe and the other the spray body. Spaces enclosed by the jacket parts can be interconnected so as to form one gas space. The jacket around the spray body need not be in thermal contact with the spray body. The structurally required places of contact for fastening and gas closure may be insulated by using heat insulating gaskets, if desired.

According to a preferred embodiment of the invention the sprayer is a two-phase sprayer, more in particular an ultrasonic two-phase sprayer. Of course, such sprayers are provided not only with a pipe for supplying a liquid, such as water, but also with a pipe for supplying gas, such as air.

In case the flue gases are contaminated with solids, the erosion problem then caused can be solved by using means for generating a substantially annular air flow around the spray head. Preferably, these means consist at least of an annular channel for generating a gas stream around the spray head, as well as of a guide for the gas stream, which guide extends at least to near the spray head. If required, there may be provided a secondary guide for guiding the gas stream closely around the spray head. The means for generating the gas stream consist of, e.g., a slot for the gas, which slot is located between the spray body and the jacket surrounding the spray body. These means may also consist of a porous material located near the spray head, through which porous material a gas stream is passed. Such a porous material may be, e.g., a sintered metal filter.

The gas for generating the protective gas stream is preferably supplied through the jackets around the supply pipe(s) and the spray body. It is not necessary to use a separate supply pipe. In such a case it may be advantageous to use a heating gas for keeping the temperature of the jackets so high that there will be no condensation of liquid on the jackets. In fact, by maintaining the temperature of the jackets above the acidic dew point of the gas, the risk of corrosion on "cold spots" is completely avoided.

The invention also relates to a process for treating a flue gas, which comprises spraying water or an aqueous liquid into the flue gas using a spraying system according to the invention.

BRIEF DESCRIPTION OF THE DRAWINGS

Embodiments of a spraying system according to the invention will be explained with reference to the accompanying drawings, in which.

DETAILED DESCRIPTION

Figure 1:
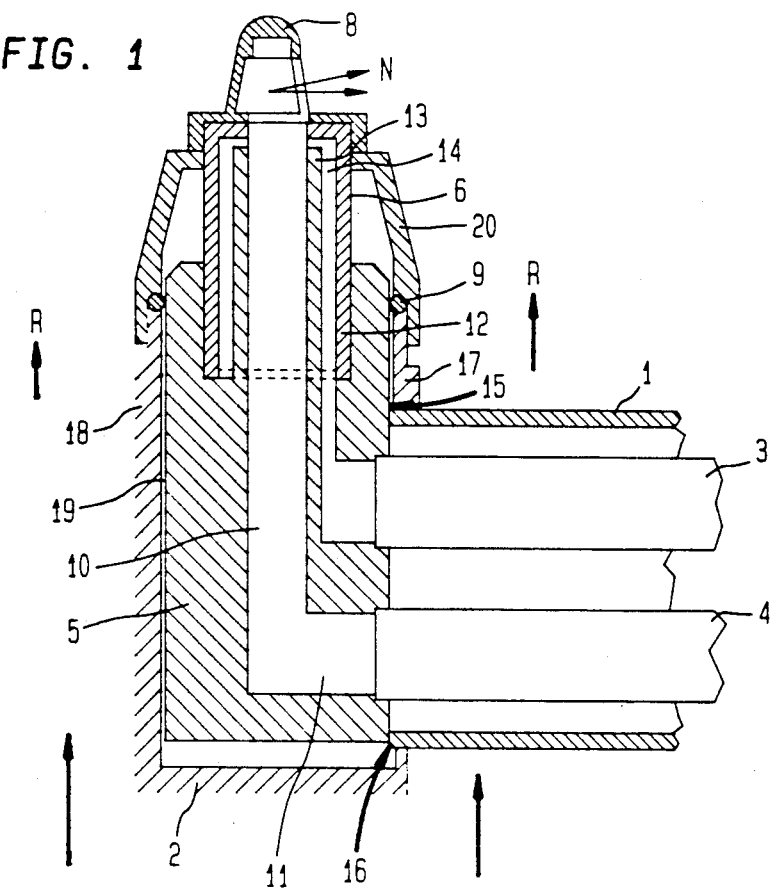
FIG. 1 is a cross-sectional view of a first embodiment.

The spraying system according to FIG. 1 is fastened to a wall (not shown) of a plant for treating flue gases. The spraying system comprises a spray body 5 provided with a centrally disposed axial channel 10 connected to the water supply pipe 4 by means of a transverse channel 11. The upper end of the spray body 5 contains a tapped hole into which a spray head 6 is screwed. The head 6 and the body 5 can also be bonded together by another method, e.g., by glueing. Located between the inner wall of the spray head 6 and the outer wall of the tubular end 13 of the spray body 5 is an annular channel 14 which at the bottom communicates with the gas supply pipe 3. The annular channel 14 opens near the end of the spray head into the central channel 10. The spray head 6 is provided with a second spray head 8 to promote ultrasonic spraying. A gas/water mist leaves the second spray head 8 as indicated by the arrows N and is included in the flue gas stream R passing along the spraying system.

The spraying system is protected from corrosion by a housing formed by a first tubular jacket 1 surrounding the gas and water supply pipes 3,4 at some distance and connected to the spray body 5 at only two places 15,16. The spray body 5 is surrounded by a second jacket 2 which in view of assembly requirements consists of two interconnected semicylindrical shells 17,18, the dividing plane of which is normal to the paper. Disposed between the outer wall of the spray body 5 and the inner wall of the second jacket 2 is an annular slot 19. The shell 17 is connected to the first jacket 1, e.g., by welding. A head 20 with an interposed 0-shaped ring 9 sealing the slot 19 is screwed on the upper end of the shells 17,18.

The cold transport from the spraying system to the jackets 1,2 can only take place via the places of contact 15,16 and the 0-shaped ring insulating by itself.

Figure 2:
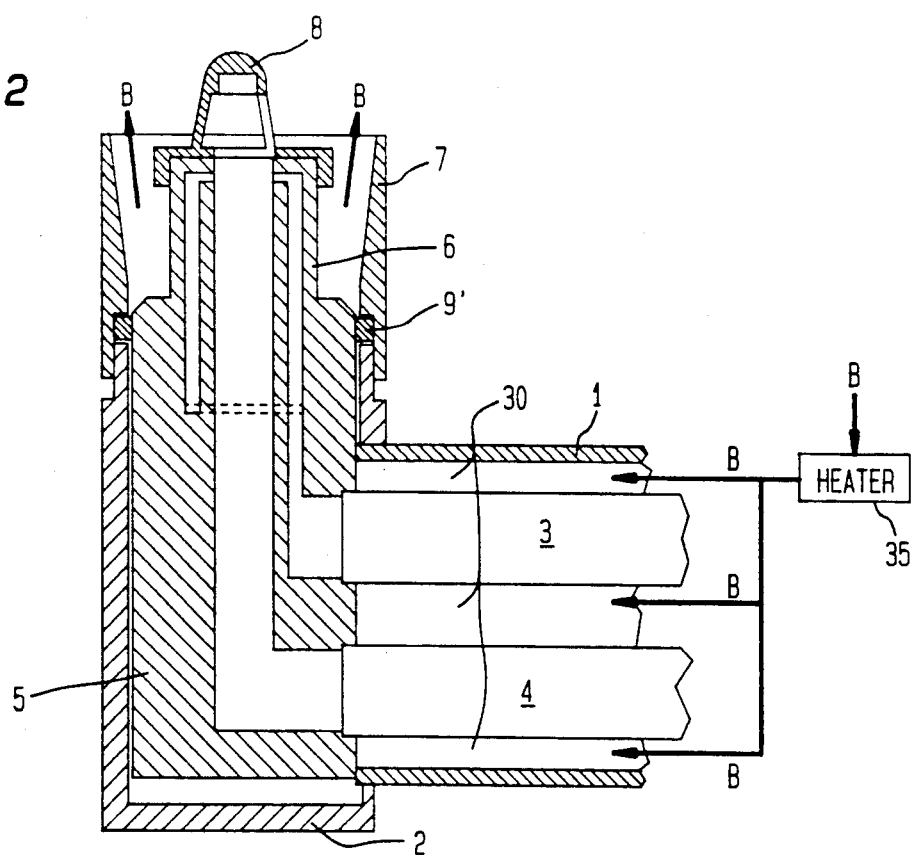
FIG. 2 is a cross-sectional view of a second embodiment.

The embodiment shown in FIG. 2 differs from the embodiment shown in FIG. 1 by the replacement of the head 20 by a diffusor-shaped guide ring 7 and the O-shaped ring 9 by a porous sintered metal ring 9'. Via this porous ring 9' a gas stream (see arrows B) surrounding the spray head 6,8 can be generated from the slot 19, which gas stream passes along the guide ring 7 and prevents erosion of the spray head 6,8 by the solids contained in the flue gas stream R (see FIG. 1). The protective gas B (shown in FIG. 2) can be supplied via channel 30 defined by the jacket 1, along the pipes 3,4, then pass through the slot (shown as slot 19 in FIG. 1) to exit through the porous ring 9' shown in FIG. 2. The protective gas B may be a heated gas and supplied through heater 35 and appropriate piping (not shown) into channel 30.

I claim:

1. A spraying system for treating a flue gas, said system comprising a liquid supply pipe, a gas supply pipe, a spray body and a spray head, said spray head being situated on said spray body and in liquid communication through said spray body with said liquid supply pipe and in gas communication with said gas supply pipe, wherein the spray body and the supply pipes are substantially surrounded by a housing and a jacket which thermally insulates the spray body and the supply pipes from the flue gas, and wherein the spray body is fastened to the housing and jacket so as to reduce heat transport occurring between the housing and the spray body such that the housing can remain at a temperature above an acidic dew point of the flue gas and wherein the housing is located near the spray body and substantially at a pre-defined distance therefrom.

2. A spraying system as claimed in claim 1, wherein the sprayer is an ultrasonic sprayer.

3. A spraying system as claimed in claim 1, further comprising means for generating a substantially annular stream of protective gas around the spray head.

4. A spraying system as claimed in claim 3, wherein said gas stream generating means comprises a circular channel for generating the gas stream around the spray head, and means affixed to said housing for guiding said gas stream, said guiding means extending at least to the vicinity of the spray head.

5. A spraying system as claimed in claim 4, wherein the protective gas is supplied through the housing situated around the supply pipes.

6. A spraying system as claimed in claim 5 further comprising means for supplying a heated gas as said protective gas.

* * * * *